United States Patent [19]

Lippens et al.

[11] Patent Number: 4,928,462
[45] Date of Patent: May 29, 1990

[54] AGRICULTURAL BALER WITH SIX STROKE FEEDER MECHANISM

[75] Inventors: Christiaan A. C. Lippens, Sint-Laureins; Adrianus Naaktgeboren, Zedelgem, both of Belgium

[73] Assignee: Ford New Holland, Inc., New Holland, Pa.

[21] Appl. No.: 354,180

[22] Filed: May 18, 1989

[30] Foreign Application Priority Data

May 24, 1988 [GB] United Kingdom ............... 8812270

[51] Int. Cl.5 .............................................. A01D 39/00
[52] U.S. Cl. ..................................... 56/341; 100/142; 100/189
[58] Field of Search .................. 56/341, 344; 100/142, 100/189

[56] References Cited

U.S. PATENT DOCUMENTS

| 2,552,888 | 5/1951 | Druetta ............................... 100/189 |
| 4,525,991 | 7/1985 | Naaktgeboren ....................... 56/341 |
| 4,751,810 | 6/1988 | Naaktgeboren et al. ............. 56/341 |

FOREIGN PATENT DOCUMENTS 7807102 6/1978 Netherlands .
2059869 9/1980 United Kingdom .
2160150 12/1985 United Kingdom ............... 100/189

Primary Examiner—Jerome W. Massie, IV
Assistant Examiner—David J. Bagnell
Attorney, Agent, or Firm—Darrell F. Marquette; Frank A. Seemar; Larry W. Miller

[57] ABSTRACT

An agricultural baler having a feeder mechanism operable to accumulate a charge of crop material in a feeder duct thent transfer an accumulated charge of crop material into a bale case. The feeder mechanism includes a plurality of tine bars provided with sets of tines so that at least two sets of tines are operative in the feeder duct at any given instant. A first tine bar carries two sets of packer tines while a second tine bar carries a set of packer tines and a set of stuffer tines. A third tine bar carries a set of packer tines along with a set of combination packer and stuffer tines. All of the packer tines have outer ends following a first path of movement and the stuffer tines have outer ends following a second path of movement which is offset relative to the first path of movement. The combination packer and stuffer tines have outer ends following a third path of movement which is offset relative to both the first and second paths of movement. The combination packer and stuffer tines effect a pre-stuffing stroke of the feeder mechanism whereas the stuffer tines effect a full stuffing stroke of the feeder mechanism.

6 Claims, 7 Drawing Sheets

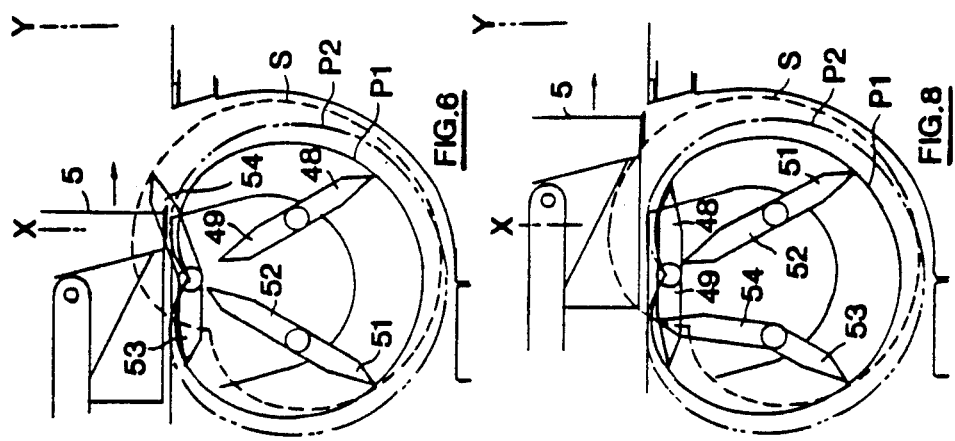
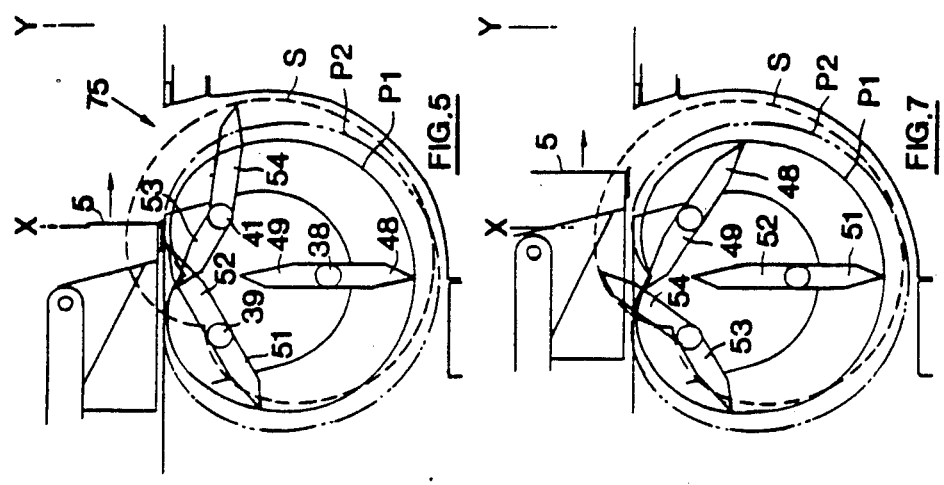

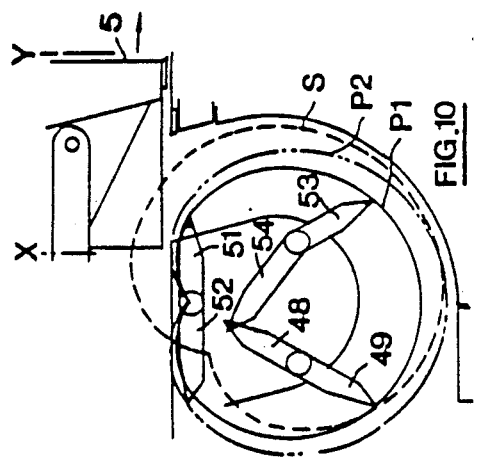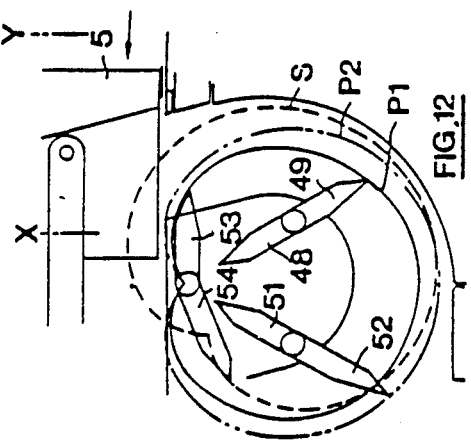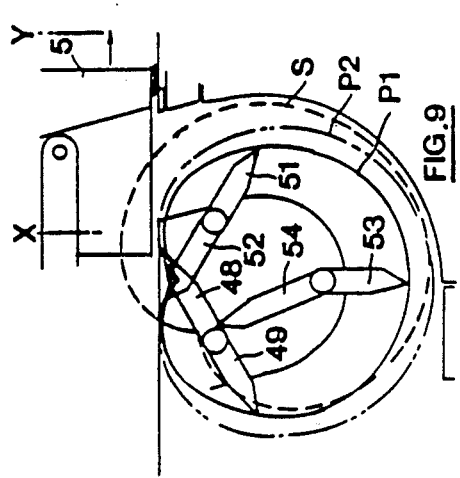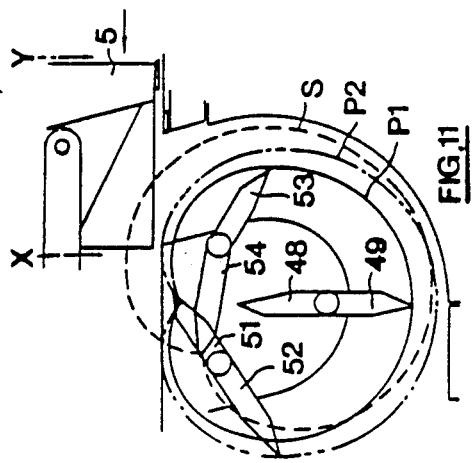

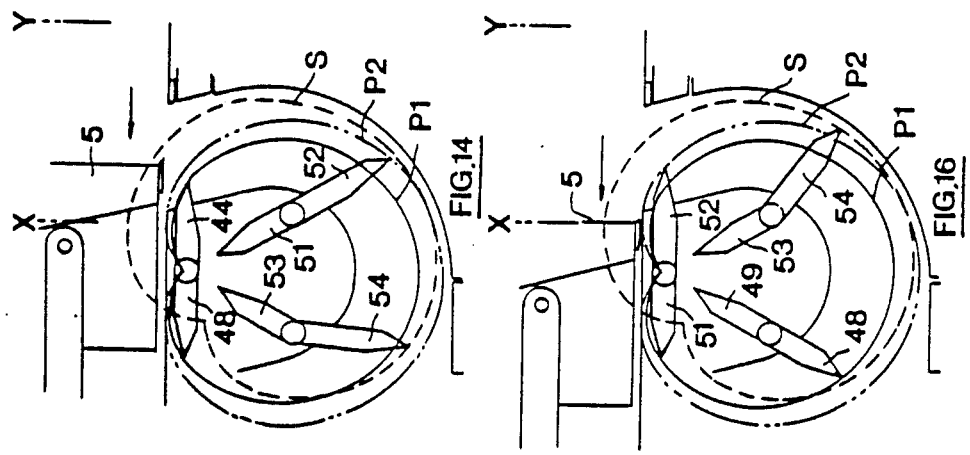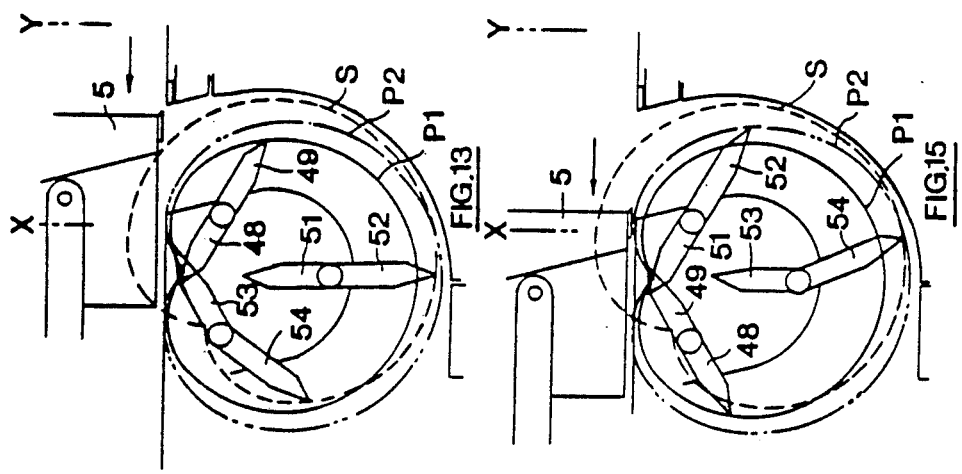

AGRICULTURAL BALER WITH SIX STROKE FEEDER MECHANISM

BACKGROUND OF THE INVENTION

This invention relates to agricultural balers for producing the so-called square or rectangular type of bale, as opposed to the cylindrical or round bale. More specifically, the invention relates to such balers which produce relatively large square bales and are constructed differently from the balers producing smaller square bales.

The principle difference between the small and large square balers is that in the former, the bale case in which a bale is actually formed has wads of crop material delivered to it from a feeder duct positioned to one side of the bale case, whereas in the latter, the feeder duct is located beneath the bale case, whereby the latter is bottom fed. Furthermore, the cross-sectional area of the bale case of the large baler is considerably greater than that for the small baler, whereby the wad of crop material periodically fed to the bale case is correspondingly larger. It is desirable to provide a relatively compact wad of crop material in the feeder duct in order to ensure a relatively constant density of the bale being formed but in the case of a large baler with the greater amount of crop material involved, this can give rise to plugging of the feeder duct when, for example, normally dry crop is damp when being baled, or naturally moist crop, such as silage, is being baled.

Traditionally, silage has been stored in silos but this requires the use of a forage harvester in order to pick up crop material and chop it into small pieces. Normally a trailer moves alongside the forage harvester and into which crop material is blown by the machine. The trailer then transports the crop material from the field to the place of storage. If a tower silo is employed, then a blower is required to transfer the silage from the trailer to the tower. Farmers are looking increasingly to the use of a baler for operating on silage because the machine is normally available to him as it is required to bale other crops and the handling and storage of bales of crop material is that much more convenient. On the other hand if any specialised equipment is required in this respect, then again it is normally available to the farmer as he will be using it to handle bales of other crop material.

The use of a baler for baling silage means that there is an increased risk of the feeder duct to the bale case becoming plugged. The general problem of plugging has been addressed in the past and steps taken to reduce the likelihood thereof, such as by the use of expandable feeder ducts as disclosed in U.S. Pat. No. 2,552,888, British Pat. No. 2,059,869 and Dutch Pat. No. 7807102, for example. However, these measures cannot be guaranteed to prevent plugging of the bale case feeder duct and when plugging occurs, it is extremely difficult, and hence time consuming, to remove the plug of crop material. This is because ready access to the feeder duct cannot be gained (even if the pick-up device is removed) and even if it could, it is not an easy task manually to pull the plug of crop material from the feeder duct because the plug is very tightly wedged in the duct and the crop feeder mechanism present in the duct aggravates the problem. Indeed, the plug is so often tightly wedged that even the feeder mechanism operable to feed crop material into the feeder duct cannot be reversed in order to help remove the plug of crop material.

U.S. Pat. No. 4,751,810 granted June 21, 1988, to A. Naaktgeboren et al and hereby incorporated by reference discloses a generally conventional square baler provided with feeder means operable in the feeder duct and comprising two rotatable tine bars to provide a number of packing strokes of operation followed by a stuffing stroke. This arrangement has been found to be generally satisfactory but still prone to plugging in extreme conditions. The present invention is based on this arrangement and seeks to reduce or eliminate plugging.

SUMMARY OF THE INVENTION

According to the present invention, there is provided an agricultural baler comprising a bale case having an inlet opening formed therein; a feeder duct communicating with the bale case through the inlet opening for charges of crop material to be transferred from the feeder duct into the bale case; a plunger reciprocable within the bale case to compress successive charges of crop material received from the feeder duct to form a bale; and feeder means operable within the feeder duct to accumulate a charge of crop material therein and then stuff that accumulated charge into the bale case. The feeder means includes a plurality of rotatable tine bars, a first of which carries a set of packer tines and a second of which carries a set of stuffer tines. The packer tines have outer ends following, during operation, a first path of movement and the stuffer tines have outer ends following, during operation, a second path of movement which is offset relative to the first path of movement. A third tine bar carries a set of combination packer and stuffer tines, whereby the feeder means subjects the crop material in the feeder duct to two stuffing strokes in transferring a charge of crop material from the feeder duct to the bale case. The combination packer and stuffer tines carried by the third tine bar have outer ends following a third path of movement which is offset relative to both the first and second paths of movement.

DESCRIPTION OF THE DRAWINGS

An agricultural baler in accordance with the present invention will now be described in greater detail, by way of example, with reference to the accompanying drawings in which:

FIGS. 5 to 16 are explanatory diagrams helpful in explaining the operation of the baler of FIGS. 1-4.

DESCRIPTION OF THE PREFERRED EMBODIMENT

Figure 1:
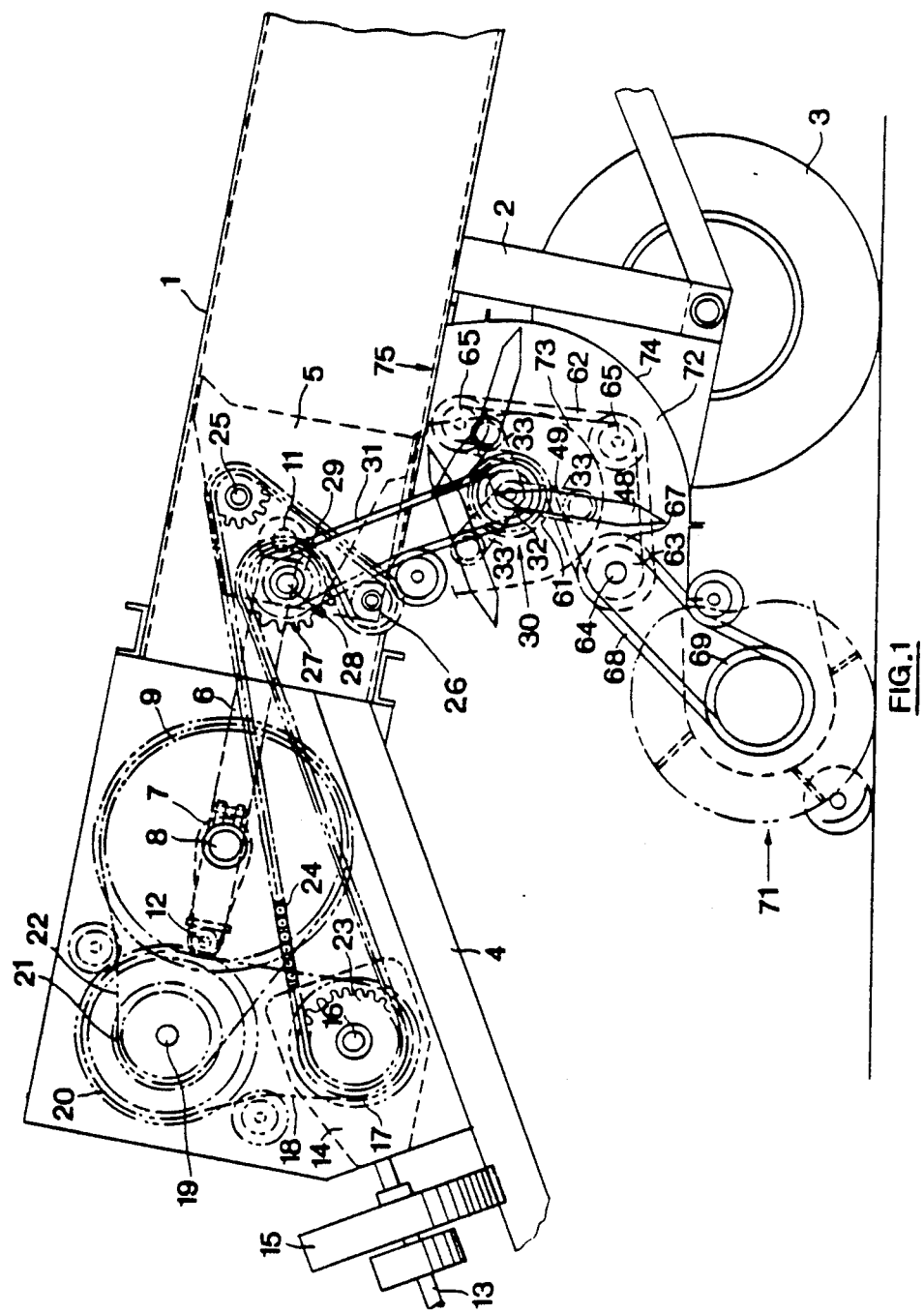
FIG. 1 is a side view of the baler.
Figure 2:
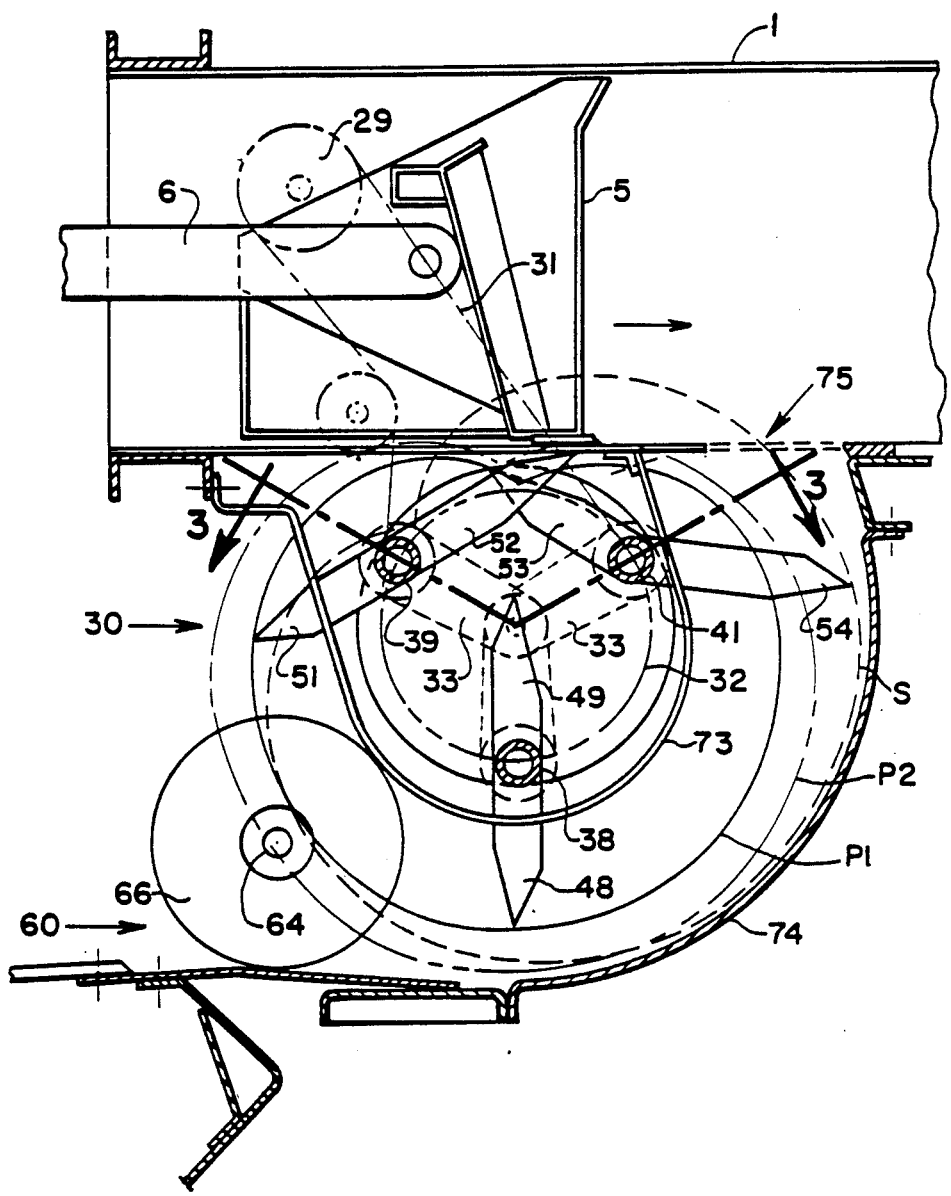
FIG. 2 is an enlarged detail of FIG. 1, partly in section.
Figure 3:
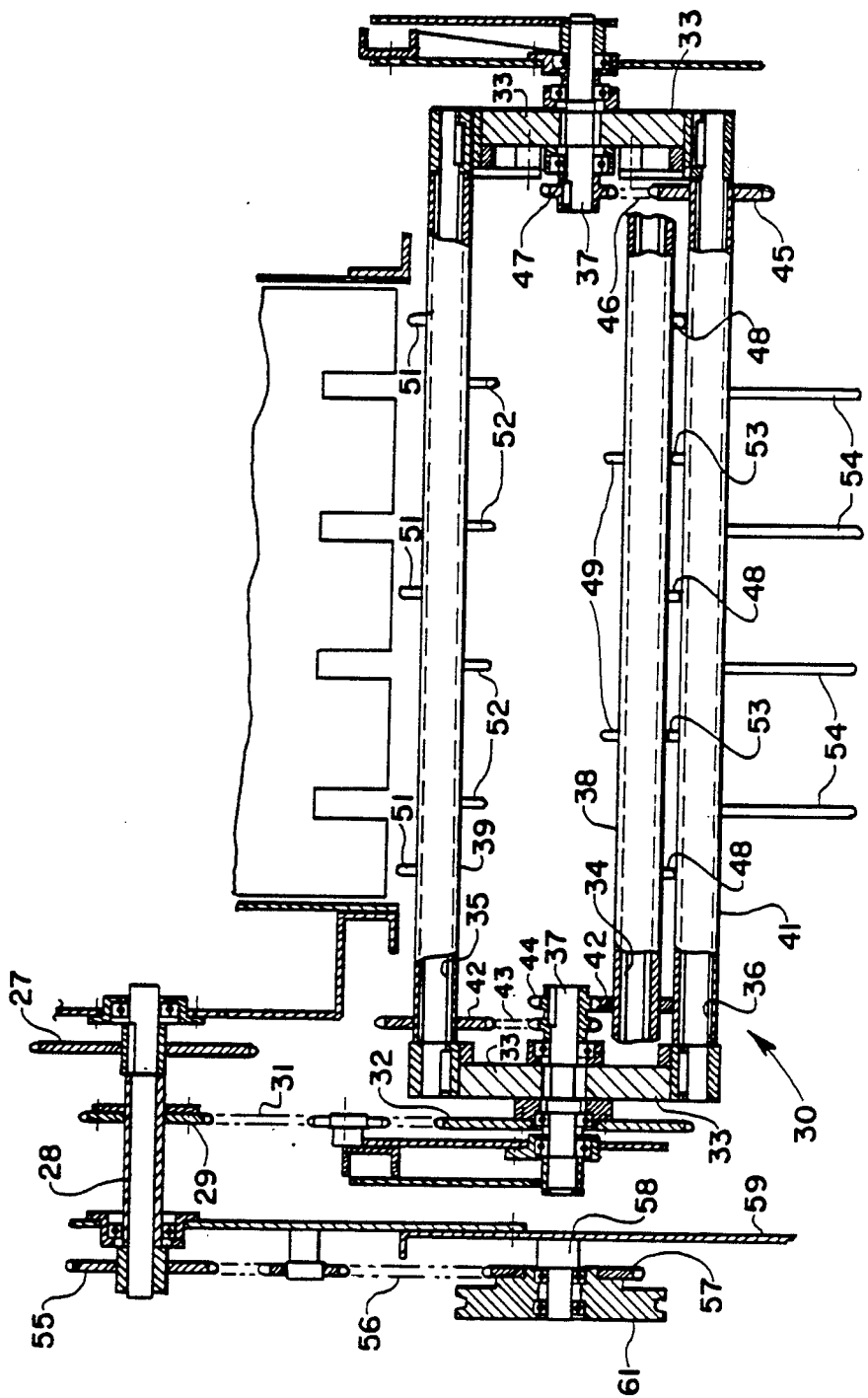
FIG. 3 is a sectional view on the line III—III of FIG. 2.

Referring to FIGS. 1 to 3 of the drawings, the baler comprises a bale case or chamber 1 mounted on a frame 2 which is supported by wheels 3. A tongue or draw bar 4 extends forwardly from the bale case 1 for attachment to a tractor or other vehicle used for towing the baler, this vehicle not being shown. A plunger 5 is mounted for reciprocation within the bale case 1 and is attached by a connecting rod 6 to a crank arm 7 attached to a crank shaft 8 which also carries a sprocket 9. The connecting rod 6 is pivotally attached to the plunger at 11 and pivotally attached at its other end to the crank arm 7 at 12. A drive shaft 13 is adapted for connection to the power take-off (PTO) of the tractor or other vehicle and is also connected to a gear box 14 on the baler via a flywheel 15.

The gear box 14 has an output shaft 16 which carries a sprocket 17 around which a chain 18 passes to a sprocket 20 of larger diameter on an intermediate shaft 19, this shaft also carrying a smaller diameter sprocket 21 connected by a chain 22 to the sprocket 9 on the crank shaft 8. This conventional arrangement effects a speed reduction for the rotation of the sprocket 9 from the gear box 14, rotation of the sprocket 9 serving to reciprocate the plunger 5 within the bale case 1 by virtue of the crank 7.

The output shaft 16 of the gear box 14 also carries a sprocket 23 around which passes a chain 24 which also extends around idler sprockets 25 and 26 and a drive sprocket 27 carried by a further intermediate shaft 28. The shaft 28 carries a further sprocket 29 connected by a chain 31 to a sprocket 32 attached to one of a pair of spaced, three-armed spiders 33 of a feeder mechanism 30. Respective pairs of arms of the spiders 33 are interconnected by tine bar supports 34, 35 and 36. The arms of the spiders 33, together with the tine bar supports 34, 35 and 36, thus form rigid frames which are rotatable about centrally disposed stub shafts 37 as can be best seen in FIG. 3. Tine bars 38, 39 and 41 are rotatably mounted on the respective tine bar supports 34, 35 and 36 and to this end, are in the form of tubes which are slid over the supports during assembly. Each tine bar 38 and 39 carries a sprocket 42 which is attached by a chain 43 to respective ones of further sprockets 44 keyed to the associated stub shaft 37. Similarly, the tine bar 41 carries a sprocket 45 connected by a chain 46 to a sprocket 47 keyed to the stub shaft 37 at the other side of the baler.

The tine bar 38 carries a set of packer tines 48 and a set of packer tines 49, these two sets of tines 48 and 49 being equal in length and angularly offset with respect to each other by 180°. The tine bar 39 carries a set of packer tines 51 and a set of combination packer and stuffer tines 52 which are also offset from one another by 180°, with the tines 51 having a length equal to that of the packer tines 48 and 49, and with the tines 52 being longer for a purpose to be described later. The tine bar 41 carries a set of packer tines 53 equal in length to tines 48, 49, 51; and a set of stuffer tines 54 which are longer than the packer tines 48, 49, 51, 53 and also longer than the combination packer and stuffer tines 52. The set of packer tines 53 and the set of stuffer tines 54 are angularly offset from one another by an angle of approximately 154°.

A further sprocket 55 is mounted on the shaft 28 for rotation in unison with the sprocket 29. A chain 56 extends around the sprocket 55 and also around a sprocket 57 rotatably mounted on a stub shaft 58, which itself is fixedly mounted on a frame member 59, co-axially with the stub shafts 37. A pulley 61 is fixedly connected to the sprocket 57, for rotation in unison therewith on the stub shaft 58. This pulley 61 drives a belt 62 which extends around a pulley 63 on a shaft 64 and around idler pulleys 65. This belt transmission formed by the components 61, 62, 63, 64 and 65 is operable to drive a first stub auger 66 mounted on the shaft 64 and provided in offset relationship with an inlet throat of a feeder duct 60, and at the left-hand side thereof as seen in the direction of operative movement of the baler.

The shaft 64 carries a further pulley 67 around which a belt 68 extends to a further pulley 69 on a crop pick-up device 71. A further belt transmission (not shown) similar to the belt transmission between the first stub auger 66 and the pick-up device 71 extends at the other side of the pick-up device between the latter and a further stub auger 66 provided in offset relation ship with the feeder duct inlet throat and at the right-hand side thereof.

In operation of the baler, crop material is picked up from the ground by the pick-up device 71 which feeds it directly to the inlet throat of the feeder duct 60 and to the stub augers 66 which then consolidate the crop material centrally of the baler for transfer into the inlet throat of the feeder duct 60 defined by opposite side walls 72, a top wall 73 and a bottom wall 74, and terminating in an inlet opening 75 in the bottom wall of the bale case 1.

As the feeder mechanism 30 is driven, the sets of tines 48, 49, 51, 52, 53 and 54 are rotated in a counterclockwise direction (as viewed in FIG. 2) about the axis extending through the stub shafts 37 by virtue of the rectangular frames, formed by the arms of the spiders 33 and the tine bar supports 34, 35, 36 being rotated in said direction via the chain transmission 31. Simultaneously, the sets of tines also are rotated, as viewed in FIG. 2, in a clockwise direction about the respective tine bar supports 34, 35, 36 by virtue of the chain transmissions 43, 46. This causes the outer ends of the tines 48, 49, 51, 52 and 53 to follow one of two paths of movement designated P1 and P2 (FIG. 2) and the outer ends of the stuffer tines 54 to follow a path of movement designated S. These paths of movement P1, P2 and S are offset relative to each other with the stuffer path S penetrating deeper (from top to bottom) into the feeder duct 60 than the paths P1 and P2. The paths of movement P1, P2 and S are generally apple-shaped because the sprockets 42 and 45 driving the tines 48, 49, 51, 52, 53, 54 orbit about the stationary sprockets 44, respectively 47 by virtue of the chains 43, respectively 46 and have twice as many teeth as the stationary sprockets 44, 47. For two complete revolutions of the rectangular frame in the counterclockwise direction as viewed in FIG. 2, i.e. 720° of rotation, the sprockets 42 an 45 with the tine bars 38, 39 and 41 make one complete revolution, i.e. 360° of rotation, in the clockwise direction relative to the tine bar supports 34, 35 and 36. The plunger 5 undergoes one full stroke (i.e. a forward working stroke and a return stroke) whilst the feeder mechanism 30 executes its two revolutions.

Figure 4:
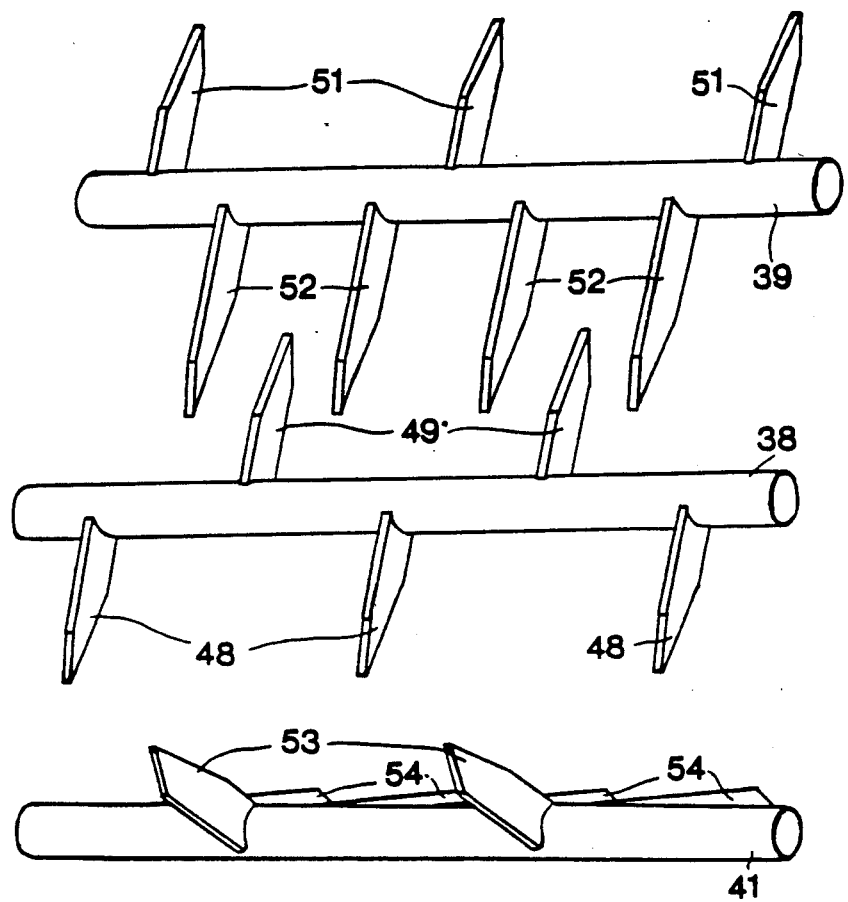
FIG. 4 is a diagrammatic view of tine bars of feeder means of the baler.

It will be seen from FIGS. 3 and 4 that the numbers of tines in the various sets differ from one set to another: there are three packer tines 48; two packer tines 49; three packer tines 51; four combination packer and stuffer tines 52; two packer tines 53; and four stuffer tines 54. Furthermore, the sets of tines are staggered so that adjacent sets do not interfere with each other.

Turning now to FIGS. 5 to 16, the sequence of operation of the machine will now be described with respect to the accumulation of charges of material in the feeder duct and the transfer of an overall accumulated charge from the feeder duct 60 into the bale case 1.

In as much as the illustrated embodiment employs three tines bars, each provided with two sets of tines, then the feeder mechanism 30 is a 6-stroke device and FIGS. 5 to 16 illustrate the 6 strokes of operation, each Figure showing the two sets of tines which are operative in the feeder duct 60 at any given instant and also showing the position of the baler plunger 5 with respect to its working stroke in which it moves to the right as seen in these figures, and with respect to its non-working or return stroke in which it moves to the left. The extent of the strokes is indicated by the letters X and Y in FIGS. 5 to 16.

FIG. 5 illustrates the positions of the various sets of tines virtually at the end of a stuffing stroke in which the stuffer tines 54 are operative to stuff the previously accumulated wad of crop material into the bale case 1 through the aperture 75 in the bottom wall thereof. Thus, at this instant, the two sets of tines which are operative in the feeder duct 60 are the stuffer tines 54 and the set of packer tines 48 provided on the tine bar 38. Accordingly, the set of packer tines 48 serves to feed crop material into the feeder duct 60 to start the accumulation and precompression of the next wad of crop material against the back-stop formed by the moving plunger 5 in a manner as described in U.S. Pat. No. 4,751,810 referred to hereabove. The packer tines 48 are followed by the set of packer tines 51 provided on the tine bar 39, as shown in FIG. 6 of the drawings. Thus, the packer tines 51 serve to feed further crop material into the feeder duct 60 once they have reached the position shown in FIG. 7 and these are followed by the set of packer tines 53 provided on the tine bar 41 as illustrated in FIG. 8 of the drawings. By the time the set of packer tines 53 are operative in the feeder duct 60, as shown in FIG. 9, the baler plunger 5 has actually closed the opening 75 in the bottom of the bale case 1 and is approaching the end of its working stroke Y in which it has pushed the previous wad of crop material along the bale case to form a bale in the bale chamber 1. At this stage, all three tine bars 38, 39, 41 have featured in the feeding of crop material into the feeder duct 60 and thus three strokes of the 6-stroke mechanism have been completed.

The fourth stroke of the feeder mechanism 30 is provided by the set of packer tines 49 provided on the tine bar 38, it being appreciated that because the respective tine bars are rotated as the tines move through the feeder duct, first one set of tines on a given tine bar is operative within the feeder duct and then the next set of tines is operative. As the set of packer tines 49 becomes operative, as shown in FIG. 10 of the drawings, the baler plunger 5 is reaching the end Y of its working stroke and starts its return or non-working stroke when the tines 53 and 49 are operative in the feeder duct 60 in the position illustrated in FIG. 11. The fourth stroke of the feeder mechanism 30 provided by the set of tines 49 is followed by the fifth stroke in which the set of combination packer and stuffer tines 52 provided on the tine bar 39 is operative as shown in FIGS. 12 and 13. It should be noted that the path followed by the outer ends of the sets of packer tines 48, 49, 51, 53 is that indicated at P1 but that the path followed by the outer ends of the set of combination packer and stuffer tines 52 is that indicated at P2, which path P2 takes the tips of the tines 52 closer to the rear or bottom wall 74 of the feeder duct 60. Accordingly, the set of combination packer and stuffer tines 52 can be said to provide a pre-stuffing stroke although it will be seen that the path P2 does not enter the bale chamber 1. This is because it is important not to initiate a full stuffing stroke while the plunger 5 is still returning to its retracted position because otherwise crop material would be stuffed against the underside of the plunger.

The fifth stroke of the feeder mechanism 30 is followed by the full stuffing or sixth stroke effected by the stuffer tines 54 provided on the tine bar 41, the stuffer tines 54 serving to feed further crop material into the feeder duct 60 as it enters the same, as shown in FIG. 14, and then proceeding to stuff the now fully accumulated wad of crop material in the feeder duct into the bale chamber 1, the bale plunger 5 being fully retracted by the time actual full stuffing commences and is completed as illustrated by FIGS. 15, 16 and 5, respectively. The path of the outer ends of the stuffer tines 54 is that indicated at S and this enters the bale case 1 in order to achieve positive transfer of the wad of crop material from the feeder duct 60 into the bale case 1, the stuffer tines 54 being accommodated by slots in the bottom of the baler plunger 5, as is well known.

It will be seen that with this 6-stroke feeder mechanism 30, there are always two sets of tines operative in the feeder duct 60 and this has proved highly successful in preventing plugging of the feeder duct 60 even when difficult and/or wet crops are being handled. Furthermore, the provision of the set of combination packer and stuffer tines 52, is also helpful in this respect.

Modification to the illustrated embodiment may be made without departing from the present invention. For example, instead of having a pre-stuffer stroke (tines 52) followed by a full stuffer stroke (tines 54), these strokes may be reversed, thus requiring a change in timing of the feeder mechanism 30 in order to ensure that the plunger 5 is fully retracted before a full stuffing stroke is effected, as discussed above. Thus the tines 52 would effect a full stuffing stroke and the tines 54 a post-stuffing stroke.

What is claimed is:

1. In an agricultural baler including:
   a bale case having an inlet opening formed therein;
   a feeder duct communicating with the bale case through the inlet opening for charges of crop material to be transferred from the feeder duct into the bale case;
   a plunger reciprocable within the bale case to compress successive charges of crop material received from the feeder duct to form a bale;
   feeder means operable within the feeder duct to accumulate a charge of crop material therein and then stuff that accumulated charge into the bale case;
   the feeder means including a plurality of rotatable tine bars a first of which carries a set of packer tines and a second of which carries a set of stuffer tines;
   the packer tines carried by the first tine bar having outer ends following, during operation, a first path of movement and the stuffer tines carried on the second tine bar having outer ends following, during operation, a second path of movement which is offset relative to the first path of movement; and
   an improvement wherein the feeder means comprises a third tine bar carrying a set of combination packer and stuffer tines, whereby the feeder means subjects the crop material in the feeder duct to two stuffing strokes in transferring a charge of crop material from the feeder duct to the bale case, the combination packer and stuffer tines carried on the third tine bar having outer ends following a third path of movement which is offset relative to both the first and second paths of movement.

2. In a baler according to claim 1 wherein the first, second, and third tine bars each carry two sets of tines.

3. In a baler according to claim 2, wherein the first tine bar carries two sets of packer tines; the second tine bar carries a set of packer tines and said set of stuffer tines; and the third tine bar carries a set of packer tines and said set of combination packer and stuffer tines.

4. In a baler according to claim 3, wherein the length of the packer tines is substantially less than the length of the stuffer tines.

5. In a baler according to claim 3, wherein the combination packer and stuffer tines carried on the third tine bar are longer than the packer tines but shorter than the stuffer tines carried on the second tine bar.

6. In a baler according to claim 5, wherein the set of combination packer and stuffer tines carried on the third tine bar effects a pre-stuffing stroke of the feeder means, and the set of stuffer tines carried on the second tine bar effects a full stuffing stroke of the feeder means.

* * * * *